US008531266B2

(12) United States Patent
Shearer et al.

(10) Patent No.: US 8,531,266 B2
(45) Date of Patent: Sep. 10, 2013

(54) SYSTEM AND METHOD FOR PROVIDING AN IN-VEHICLE TRANSMITTER HAVING MULTI-COLORED LED

(75) Inventors: Carl Shearer, Hudsonville, MI (US); William M. Jarocha, South Lyon, MI (US); Jeremy Bos, Coopersville, MI (US); Todd R. Witkowski, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 2111 days.

(21) Appl. No.: 11/443,513

(22) Filed: May 30, 2006

(65) Prior Publication Data

US 2007/0008065 A1     Jan. 11, 2007

Related U.S. Application Data

(63) Continuation-in-part of application No. 10/531,667, filed as application No. PCT/US03/33252 on Oct. 20, 2003.

(60) Provisional application No. 60/419,451, filed on Oct. 18, 2002.

(51) Int. Cl.
  *G05B 23/02*     (2006.01)

(52) U.S. Cl.
  USPC ........................................ 340/3.9; 340/13.31

(58) Field of Classification Search
  USPC ............. 340/825.22, 815.45, 815.53, 825.17, 340/5.7, 5.71, 5.72, 4.3, 815.4, 13.31, 3.7, 340/12.54
  See application file for complete search history.

(56) References Cited

U.S. PATENT DOCUMENTS

| | | | |
|---|---|---|---|
| 5,726,645 A * | 3/1998 | Kamon et al. | ........... 340/825.22 |
| 5,761,206 A | 6/1998 | Kackman | |
| 5,896,575 A | 4/1999 | Higginbotham et al. | |
| 5,905,433 A | 5/1999 | Wortham | |
| 5,973,611 A * | 10/1999 | Kulha et al. | ................. 340/5.62 |
| 6,028,537 A | 2/2000 | Suman et al. | |
| 6,091,343 A | 7/2000 | Dykema et al. | |

(Continued)

FOREIGN PATENT DOCUMENTS

| | | |
|---|---|---|
| DE | 4302015 A1 | 8/1993 |
| EP | 1 014 326 A1 | 6/2000 |

(Continued)

OTHER PUBLICATIONS

U.S. Office Action for U.S. Appl. No. 10/531,667, mailed Nov. 10, 2009, 16 pages.

(Continued)

*Primary Examiner* — Jennifer Mehmood
*Assistant Examiner* — Yong Hang Jiang
(74) *Attorney, Agent, or Firm* — Foley & Lardner LLP

(57) ABSTRACT

A wireless control system for wireless control of a remote electronic system configured to provide information to a user using a multi-colored LED. The system includes a transmitter circuit configured to transmit a wireless control signal having control data which will control the remote electronic system, a multi-colored light emitting diode display configured to provide an indication of a state of the wireless control system, and a control circuit coupled to the trainable transmitter circuit configured to transmit the wireless control signal through the trainable transmitter circuit based on the state of the wireless control system.

11 Claims, 5 Drawing Sheets

(56) References Cited

U.S. PATENT DOCUMENTS

| | | | |
|---|---|---|---|
| 6,271,765 B1 * | 8/2001 | King et al. | 340/825.69 |
| 6,426,820 B1 * | 7/2002 | Verzulli | 398/106 |
| 6,433,699 B1 | 8/2002 | Slomowitz et al. | |
| 6,466,832 B1 * | 10/2002 | Zuqert et al. | 700/94 |
| 6,490,439 B1 * | 12/2002 | Croft et al. | 455/90.1 |
| 6,513,723 B1 * | 2/2003 | Mueller et al. | 236/46 R |
| 6,980,117 B1 | 12/2005 | Kirkland et al. | |
| 2002/0180600 A1 | 12/2002 | Kirkland et al. | |
| 2006/0158344 A1 * | 7/2006 | Bambini et al. | 340/825.69 |

FOREIGN PATENT DOCUMENTS

| | | |
|---|---|---|
| JP | 10-176448 | 6/1998 |
| JP | 10-191464 | 7/1998 |
| JP | 2001-012176 | 1/2001 |
| KR | 20040058656 | 7/2004 |
| WO | WO 00/75905 A1 | 12/2000 |
| WO | WO 2004/036526 A2 | 4/2004 |

OTHER PUBLICATIONS

International Search Report for PCT/US2003/033252, mailed Apr. 6, 2004, 4 pages.

International Search Report and Written Opinion for PCT/US2007/069902, mailed Jan. 21, 2008, 9 pages.

Office Action for U.S. Appl. No. 10/531,667, mailed Feb. 9, 2009, 10 pages.

Priority Document for U.S. Appl. No. 60/419,451, dated Jan. 7, 2004, 23 pages.

European Office Action dated Jun. 8, 2012 as received in corresponding European Application No. 07 797 852.6, 6 pages.

* cited by examiner

SYSTEM AND METHOD FOR PROVIDING AN IN-VEHICLE TRANSMITTER HAVING MULTI-COLORED LED

CROSS-REFERENCE TO RELATED PATENT APPLICATIONS

The present application is a Continuation-In-Part of U.S. patent application Ser. No. 10/531,667, filed Oct. 20, 2003, which is a National Stage of PCT/US2003/033252, filed on Oct. 20, 2003, which claims priority to U.S. Provisional Patent Application No. 60/419,451 filed on Oct. 18, 2002, the disclosures of which are incorporated herein by reference in their entirety.

BACKGROUND

In the field of wireless control of remote electronic-systems, technological advances have been developed to improve convenience, security, and functionality for the user. One example is a trainable transceiver for use with various remote electronic systems, such as security gates, garage door openers, lights, and security systems. A user trains the trainable transceiver by, for example, transmitting a signal from a remote controller in the vicinity of the trainable transceiver. The trainable transceiver learns the carrier frequency and data code of the signal and stores this code for later retransmission. In this manner, the trainable transceiver can be conveniently mounted within a vehicle interior element (e.g., visor, instrument panel, overhead console, etc.) and can be configured to operate one or more remote electronic systems.

The success of the training operation for the trainable transceiver is dependent in part upon receiving a quality signal from the remote controller. However, a user may not be able to tell whether a quality signal was received until the trainable transmitter attempts to transmit the learned signal and the operation is a success or failure. Additionally, the success or failure of the transmission may have occurred based on signal strength, but may also have been caused by interference, a failure of the remote device, etc.

Other advances are also needed in the field of wireless control of remote electronic systems, particularly in the case of using automotive electronics to control remote electronic systems. As automotive manufacturers are adding an increased number of electronic systems to the vehicle to improve convenience, comfort, and productivity, simplifying the interface and control of these electronic systems is also becoming increasingly important. In addition, as automotive manufacturers are adding increased electronic systems to the vehicle, providing greater and more refined control over more systems is also becoming increasingly important.

The operator of a trainable transmitter often will use the trainable transmitter to control a large number of remote electronic systems at a variety of locations. For example, the operator may use the trainable transmitter to control a first set of remote electronic systems at his home, such as an entry gate, a garage door opener, and a home security system and to control a second set of remote electronic systems at an office location, such as a parking garage lift gate and a building entry door. Control of the large number of systems is difficult because of the number of control switches that may be required and the limited space available in the driver area of a vehicle.

What is needed is an improved wireless control system and method for wireless control of a remote electronic system from a vehicle, wherein the trainable transmitter is configured to provide information using a multi-colored LED. Further, what is needed is a system and method of using a multi-colored LED to allow a trainable transmitter to control a large number of remote electronic systems using a simple interface. Further still, what is needed is a trainable transmitter configured to provide an indication of the signal strength being received at the trainable transmitter from a remote control.

The teachings hereinbelow extend to those embodiments which fall within the scope of the appended claims, regardless of whether they accomplish one or more of the above-mentioned needs.

SUMMARY

According to an exemplary embodiment, a wireless control system for wireless control of a remote electronic system configured to provide information to a user using a multi-colored LED is provided. The system includes a transmitter circuit configured to transmit a wireless control signal having control data which will control the remote electronic system, a multi-colored light emitting diode display configured to provide an indication of a state of the wireless control system, and a control circuit coupled to the trainable transmitter circuit configured to transmit the wireless control signal through the trainable transmitter circuit based on the state of the wireless control system.

According to another exemplary embodiment, a wireless control system for wireless control of a remote electronic system configured to provide information to a user using a multi-colored LED is described. The system includes a trainable transmitter circuit configured to transmit a wireless control signal having control data which will control the remote electronic system, a multi-colored light emitting diode display configured to provide feedback indicative of received signal strength during a training mode, and a control circuit coupled to the trainable transmitter circuit configured to transmit the wireless control signal through the trainable transmitter circuit based on the state of the wireless control system.

According to yet another exemplary embodiment, a method of providing training mode feedback to user of a wireless control system for wireless control of a remote electronic system in a training mode is provided. The method includes receiving a wireless control signal, determining the signal strength of the received wireless control signal, and modifying the color of a multi-colored light emitting diode based on the signal strength of the received wireless control signal.

BRIEF DESCRIPTION OF THE DRAWINGS

The invention will become more fully understood from the following detailed description, taken in conjunction with the accompanying drawings, wherein like reference numerals refer to like parts, and in which.

DETAILED DESCRIPTION OF EXEMPLARY EMBODIMENTS

Figure 1:
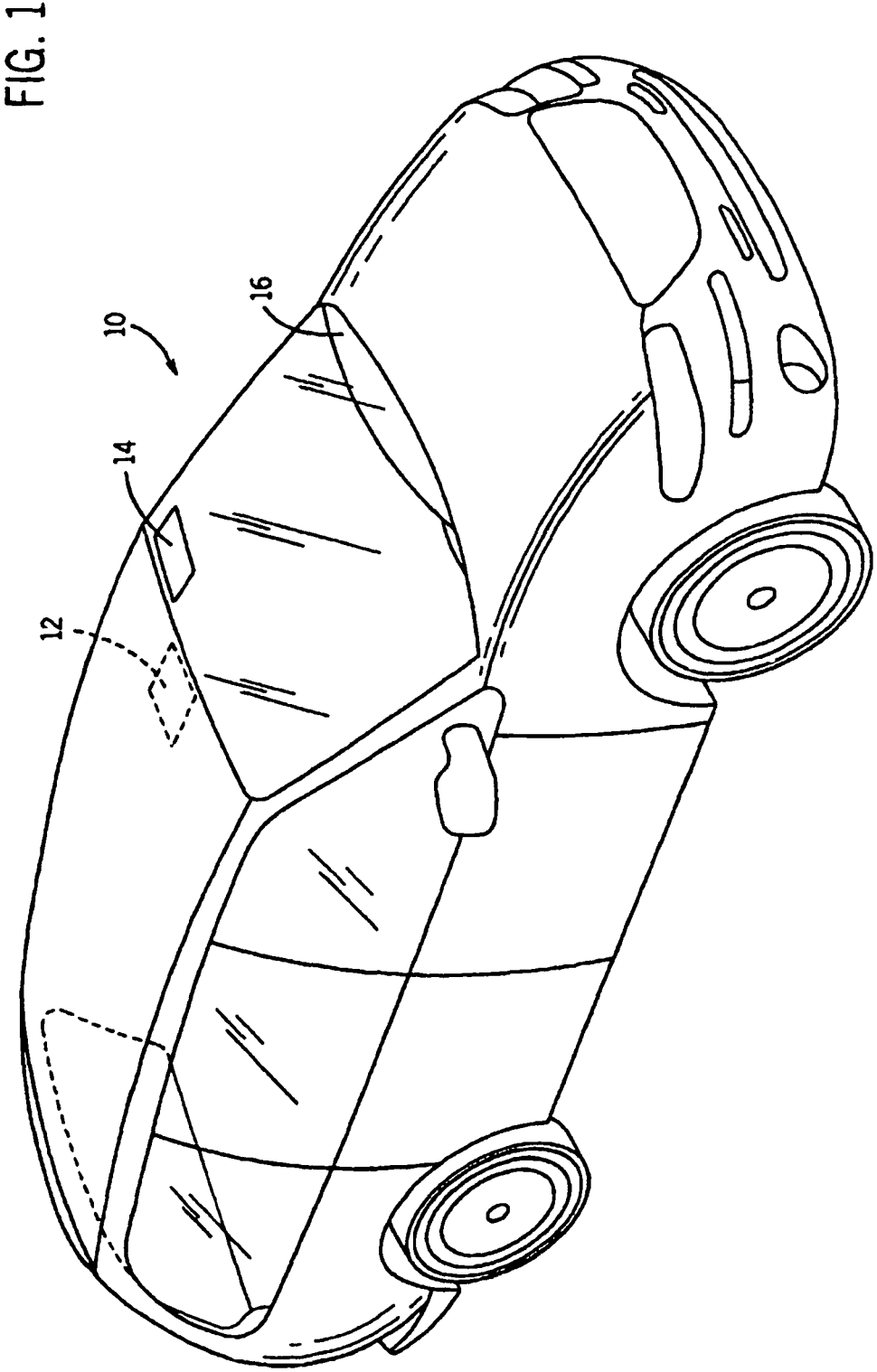
FIG. 1 is a perspective view of a vehicle having a wireless control system, according to an exemplary embodiment.

Referring first to FIG. 1, a vehicle 10, which may be an automobile, truck, sport utility vehicle (SUV), mini-van, or other vehicle, includes a wireless control system 12. Wireless control system 12, the exemplary embodiments of which will be described hereinbelow, is illustrated mounted to an overhead console of vehicle 10. Alternatively, one or more of the elements of wireless control system 12 may be mounted to other vehicle interior elements, such as, a visor 14 or instrument panel 16. Alternatively, wireless control system 12 could be mounted to a key chain, keyfob or other handheld device.

Figure 2:
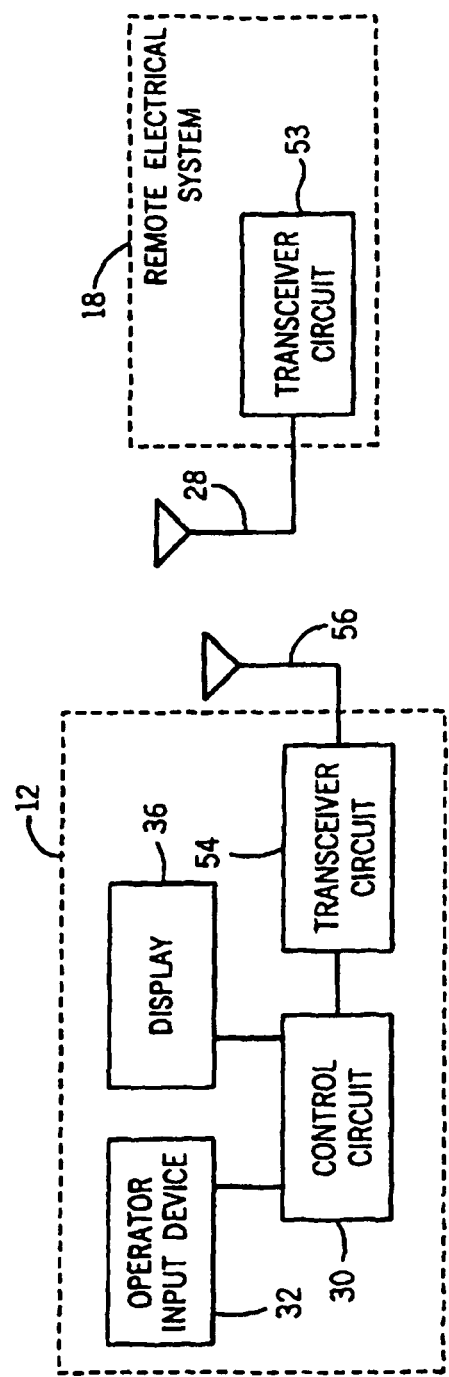
FIG. 2 is a block diagram of a wireless control system and a remote electronic system, according to an exemplary embodiment.

Referring now to FIG. 2, wireless control system 12 is illustrated along with a remote electronic system 18 which may be any of a plurality of remote electronic systems, such as, a garage door opener, a security gate control system, security lights, remote lighting fixtures or appliances, a home security system, etc. For example, remote electronic system 18 may be a garage door opener, such as the Whisper Drive garage door opener, manufactured by the Chamberlain Group, Inc., Elmhurst, Ill. Remote electronic system 18 may also be a lighting control system using the X10 communication standard. Remote electronic system 18 includes a transceiver circuit 53 and an antenna 28.

Transceiver circuit 53 includes transmit and/or receive circuitry configured to communicate via antenna 56 with wireless control system 12. Transceiver circuit 53 is configured to receive wireless control signals having control data which will control remote electronic system 18. For example, the control data can cause a garage door opener to open or close a garage door. Transceiver circuit 53 may further be configured to transmit wireless status signals having status data indicating the current status of remote electronic system 18.

The status data on the wireless status signal may include a "SUCCESS" status indicative that the control signal was properly received and the control function was successfully executed by remote electronic system 18. The wireless status signal may be sent upon completion of the function specified in the wireless control signal. The status data may also be an "ACKNOWLEDGE" status indicative that a proper wireless control signal was received by transceiver circuit 53. According to an alternative embodiment, remote electronic system 18 can send a plurality of "IN PROCESS" status signals until completion of the operation whereupon a "SUCCESS" or "FAILURE" status signal may be sent. According to yet more alternative embodiments, the wireless status signal may include other information relevant to remote electronic system 18 for transmittal to wireless control system 12. Examples can include whether a garage door is open or closed or moving between open and closed position, whether a security system is armed or disarmed, whether a light is on or off, etc. The wireless signals are preferably in the ultra-high frequency (UHF) band of the radio frequency spectrum, but may alternatively be infrared signals or other wireless signals.

Wireless control system 12 includes a control circuit 30 configured to control the various portions of system 12, to store data in memory, to operate preprogrammed functionality, etc. Control circuit 30 may include various types of control circuitry, digital and/or analog, and may include a microprocessor, microcontroller, application-specific integrated circuit (ASIC), or other circuitry configured to perform various input/output, control, analysis, and other functions to be described herein. Control circuit 30 is coupled to an operator input device 32 which includes one or more push button switches 34 (see FIG. 3), but may alternatively include other user input devices, such as, switches, knobs, dials, a voice-actuated input control circuit configured to receive voice signals from a vehicle occupant, etc. and to provide such signals to control circuit 30 for control of system 12.

Control circuit 30 is further coupled to a display 36 which includes a light-emitting diode (LED), such as, display element 38. Display 36 may alternatively include other display elements, such as a liquid crystal display (LCD), a vacuum florescent display (VFD), or other display elements. Display element 38 can include a single multi-colored LED (e.g., green, red, and yellow) or multiple LEDs, each representing a different color.

Wireless control system 12 further includes a transceiver circuit 54 including transmit and/or receive circuitry configured to communicate via antenna 56 with remote electronic system 18. Transceiver circuit 54 is configured to transmit wireless control signals having control data which will control remote electronic system 18. Transceiver circuit 54 is further configured to receive wireless status signals including status information from remote electronic system 18.

In operation, wireless control system 12 is configured to receive one or more characteristics of an activation signal sent from an original transmitter. An original transmitter is a transmitter, typically a hand-held transmitter, which is sold with remote electronic system 18 or as an after-market item, and which is configured to transmit an activation signal at a predetermined carrier frequency and having control data configured to actuate remote electronic system 18. For example, the original transmitter can be a hand-held garage door opener transmitter configured to transmit a garage door opener signal at a frequency, such as 355 megaHertz (MHz), wherein the activation signal has control data, which can be a fixed code or a cryptographically-encoded code. Remote electronic system 18 is configured to open a garage door, for example, in response to receiving the activation signal from the original transmitter.

Transceiver 54 is configured to receive one or more characteristics of the activation signal from the original transmitter or from another source, which characteristics can include the frequency, control data, modulation scheme, etc. In this embodiment, transceiver 54 is configured to learn at least one characteristic of the activation signal by receiving the activation signal, determining the frequency of the activation signal, and demodulating the control data from the activation signal. Wireless control system 12 can be a Homelink® trainable transceiver, manufactured by Johnson Controls Interiors LLC, Holland, Mich., and may be constructed according to one or more embodiments disclosed in U.S. Pat. Nos. 6,091,343, 5,854,593 or 5,708,415, which are herein incorporated by reference in their entirety. Alternatively, wireless control system 12 can receive one or more characteristics of the activation signal by other methods of learning. For example, the one or more characteristics of the activation signal can be preprogrammed into memory during manufacture of wireless control system 12 or can be input via operator input device 32 (which can include a key pad, buttons, etc.). In this manner, wireless control system 12 need not actually receive the activation signal in order to receive characteristics of the activation signal. Wireless control system 12 can receive the characteristics of the signal by any of these methods and store the characteristics of the activation signal in memory.

Transceiver circuit 54 is configured, under control from control circuit 30, to generate a carrier frequency at any of a number of frequencies in the ultra-high frequency range, preferably between 20 and 470 megaHertz (MHz), more specifically between 280 and 430 MHz, wherein the control data modulated on to the carrier frequency signal may be frequency shift key (FSK) or amplitude shift key (ASK) modulated, or may use another modulation technique. The control data on the wireless control signal may be a fixed code or a rolling code or other cryptographically encoded control code suitable for use with remote electronic system 18.

Figure 3:
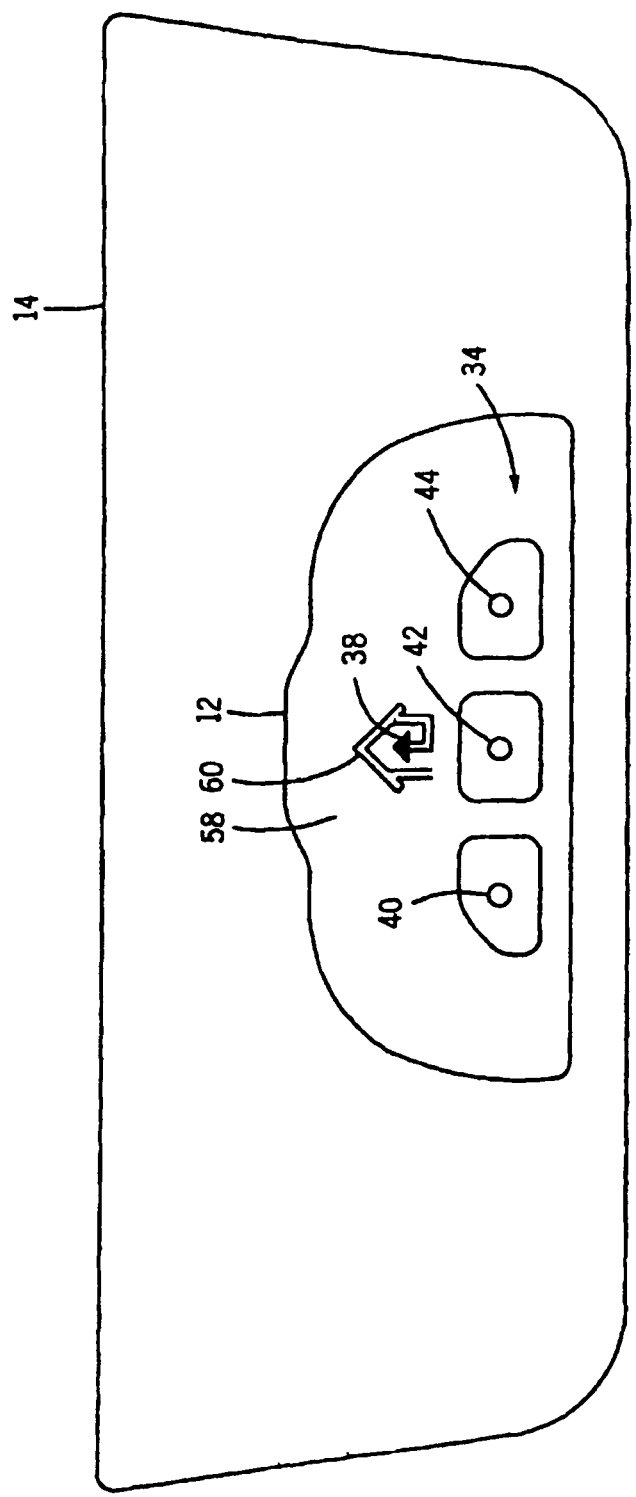
FIG. 3 is a schematic diagram of a visor having a wireless control system mounted thereto, according to an exemplary embodiment.

Referring now to FIG. 3, an exemplary wireless control system 12 is illustrated coupled to a vehicle interior element, namely a visor 14. Visor 14 is of conventional construction, employing a substantially flat, durable interior surrounded by a cushioned or leather exterior. Wireless control system 12 is mounted to visor 14 by fasteners, such as, snap fasteners, barbs, screws, bosses, etc. and includes a molded plastic body 58 having three push button switches disposed therein. Each of the switches includes a respective back-lit icon 40, 42, 44. According to an exemplary embodiment, back-lit icons 40, 42, 44 may be implemented as a multi-colored LED, similar to display 36. Body 58 further includes a logo 60 inscribed in or printed on body 58 and having a display element 30 disposed therewith. During training and during operation, display element 38 is selectively lit by control circuit 30 (FIG. 2) to communicate certain information to the user, such as, a current state of the control system 12, whether the control system 12 is transmitting a wireless control signal, the relative strength of a signal being received by control system 12, etc. The embodiment shown in FIG. 3 is merely exemplary, and alternative embodiments may take a variety of shapes and sizes, and have a variety of different elements.

In operation, wireless control system 12 is configured for wireless control of remote electronic system 18. Wireless control system 12 is configured to provide feedback to the user regarding the training of control system 12, the current state of control system 12, etc. For example, wireless control system 12 may be configured to use a multi-colored LED display 38 to provide feedback to a user regarding the strength of a signal received from an original transmitter being received at control system 12, as will now be described with reference to FIG. 4. According to another example, wireless control system 12 may be configured to use multi-colored LED display 36 to provide an indicia of a current state of wireless control system 12, where the current state affects the functionality associated with input devices 34, as will be described below with reference to FIG. 5

Figure 4:
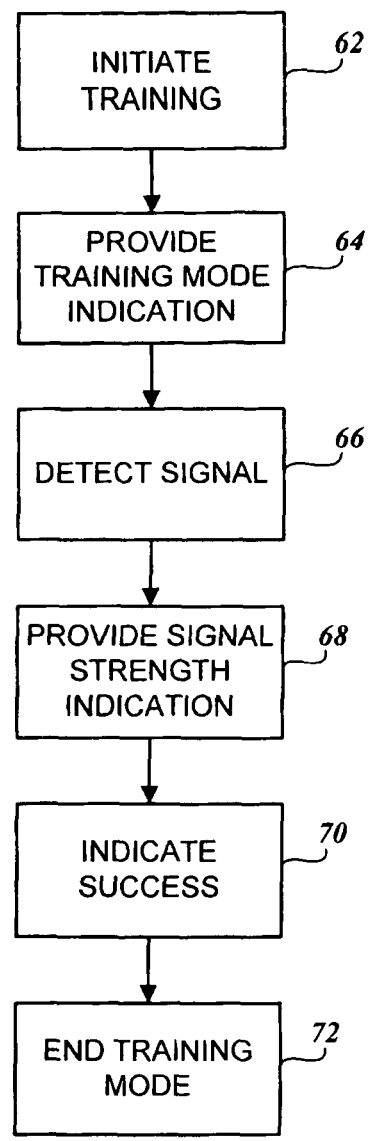
FIG. 4 is a flowchart illustrating a method of improving training for wireless control system for FIG. 2 by providing an indication of the strength of a signal being received from an original transmitter using a multi-colored LED, according to an exemplary embodiment.

Referring now to FIG. 4, an exemplary method of improving training for wireless control system 12 by providing an indication of the strength of a signal being received by system 12 from an original transmitter using a multi-colored LED display will now be described. It is understood that one or more of the steps in this exemplary method may be eliminated or rearranged in various embodiments.

At step 62, a training mode for wireless control system 12 is initiated. According to an exemplary embodiment, described above with reference to FIG. 3, initiation of a training mode for wireless control system 12 can include continuous depression, for a pre-defined period of time such as 5 seconds, of one or more push button switches (e.g., as part of operator input device 32) disposed on a wireless control system 12 attached to a vehicle interior element. According to alternative embodiments, initiation of training mode can include depression of a button on a handheld wireless transmitter, such as a keyfob, use of a voice command, or any other user input to enter the training mode for wireless control system 12.

At step 64, control circuit 30 can turn display element 38 (e.g., an LED) associated with wireless control system 12 red to indicate to the user that the training mode for wireless control system 12 has been actuated. A red indication may further be used to indicate that no signal is currently being received by control system 12 from an original transmitter, described in further detail below. Alternatively, display element 38 may be configured to blink multiple times to indicate that training mode has been initiated but that no signal is being received and then light continuously once a signal is detected.

In a step 66, wireless control system 12 may begin scanning for a wireless control signal being transmitted by an original transmitter for the remote electronic system 18. According to an exemplary embodiment, a user may be instructed to actuate the original transmitter within a close range of wireless control system 12. Accordingly, the signal being transmitted from the original transmitter will be detected and received by wireless control signal 12.

In a step 68, wireless control system 12 may be configured to provide an indication using the multi-colored LED display 36 of the relative strength of the received signal. The strength of the received signal may be affected be any of a variety of factors, such as the position of the original transmitter, positioning of a directional antenna in the original transmitter, objects within a transmission path between the original transmitter and control system 12, environmental factors, etc. The stronger the signal received from the original transmitter, the more likely that control system 12 will be able to successfully train to that signal.

Signal strength may be measured by control system 12 using a received signal strength indicator (RSSI) circuit (not shown). The received signal strength may be calculated by demodulating the selected bit or bits of a frame or message modulated onto the received signal. The demodulated bit or bits may then be associated with an RF power (i.e., signal strength), and digitized with an analog-to-digital (A/D) converter. The output of the A/D converter provides the RSSI count. Received signal strength may be generated for either and/or both frequency-modulated (FM) and amplitude-modulated (AM) signals, as dictated by the received signal.

Control system 12 may be configured to use a defined color signal strength feedback scheme, previously provided to the user, to indicate the relative strength of the received signal. According to a simple example, display 36 may display a red color when the strength of the received signal is insufficient for successful training and display a green color when the strength of the received signal is sufficient to allow training. Display 36 may further be configured to display a yellow color when the strength is intermittently strong enough although not consistent (indicating the user is close to a signal that is strong enough to train). According to another exemplary embodiment, yellow may be used to indicate that the user should move the original transmitter closer to the trainable transmitter, red may be used to indicate that the user should move it further away, and green may be used to indicate that the transmitter is in the correct position. Although a few simple examples are provided, one of ordinary skill in the art could appreciate that a variety of color schemes may be implemented.

Alternatively, advanced color signal strength feedback schemes may also be implemented. According to a first example, a color scheme may include using a combination of LED colors moving from green to orange to yellow to blue to green to indicate changes in signal strength as the user repositions the original transmitter relative to control system 12. According to a second example, another color scheme may include alternatively flashing a red light and a green light to indicate a decrease or increase, respectively, in the received signal strength.

In a step 70, when a signal of sufficient strength has been received, wireless control system 12 can record the signal frequency and control data to memory and generate and transmit a wireless control signal representative of the received data to actuate the remote electronic device. Where control system 12 successfully records and transmits the received signal, system 12 can turn the LED display 36 green for a period of time to indicate successful training. Following step 70, wireless control system 12 can exit the training mode in a step 72.

Providing a signal strength indication to a user of control system 12 can greatly facilitate training. Even where training is unsuccessful, provision of the signal strength color feedback can identify or remove signal strength as a potential source of the training issue. For example, where wireless control system 12 has provided feedback that indicates that sufficient signal strength was received during training, the user may examine other aspects of the transmission.

Figure 5:
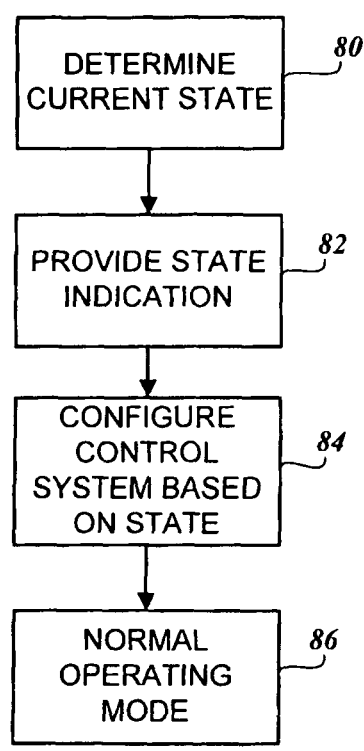
FIG. 5 is a flowchart illustrating a method of providing state information for the wireless control system of FIG. 2 using a multi-colored LED, according to an exemplary embodiment.

Referring now to FIG. 5, an exemplary method of providing state information for wireless control system 12 using a multi-colored LED display 36 will now be described according to an exemplary embodiment. It is understood that one or more of the steps in this exemplary method may be eliminated or rearranged in various embodiments.

At step 80, a current state of wireless control system 12 may be determined. The state of wireless control system 12 may be a representation of the functionality associated with each input switch or device 32, shown in FIG. 2. Accordingly, in a first state, wireless control system 12 may be configured to transmit a first wireless control signal associated with first remote electronic system in response to actuation of a first input device and in a second state wireless control system 12 may be configured to transmit a second wireless control signal associated with first second electronic system in response to actuation of the same first input device. Configuring wireless control system 12 to include multiple states allows the user to control a larger number of remote electronic device while continuing to provide a simple interface to control system 12.

State may determined based on any of a variety of occurrences such as initiation of system 12, such as when the user first starts the vehicle 10, when system 12 receives a "change state" instruction, described in detail below, when system 12 resets, etc. A "change state" instruction may be received based on a user input, such as depression of one of devices 32 for a period of time or depression of multiple input devices 32, etc. A "change state" instruction may also be generated by system 12. For example, where system 12 is coupled to a GPS device and system 12 is able to determine that the user is traveling from a work location to a home location, system 12 may be configured to automatically change state from a work state, where input devices 32 are configured to control remote electronic systems at a work location, to a home state, where input devices 32 are configured to control remote electronic systems at a home location.

In a step 82, wireless control system 12 may be configured to provide an indication to the user of the current state of control system 12 using the multi-colored LED display 36. For example, display 36 be configured to be "red" in a first state, "yellow" in a second state, and "green" in a third state. Where control system 12 includes three input switches and three potential states, a user can train control system 12 to be able to transmit up to nine different wireless control signals to remote electronic system. Other states may include a training mode state, an operating mode state, a transmitting state, an idle state, a button press received state (where the transmitter is configured to transmit for a period of time after the button is released), a training signal received/frequency identified/code stored/etc. state, etc.

The user may be encouraged to group remote electronic systems within each state. For example, a user may be encouraged to use a "green" state to control remote electronic systems at the user's home, a "yellow" state to control a plurality of remote electronic systems at the user's vacation property, and a "red" state to control a plurality of remote electronic systems at the user's work. Advantageously, the user will be able to recognize the current state of control system 12 and now the functionality associated with each input device 32 based on the state.

In a step 84, following the display of the color indicia, control system 12 may be configured to reconfigure the functionality associated with each of input device 32 based on the change in state. For example, wherein a first input device was configured to control a parking garage gate and that state of control system 12 has switched from a work state to a home state, the first input device may be configured to control a garage door opener at the home of the user. After reconfiguration, control system 12 may return to a normal operating mode in a step 86 until another change of state instruction is received.

Providing a multi-colored LED indication of the current state of system 12 allows system 12 to control a larger number of remote electronic devices while maintaining the simplicity and ease of use of control system 12. Color feedback allows the user to identify not only the current state, but also the functionality associated with each of the input devices 32.

While the exemplary embodiments illustrated in the FIGS. and described above are presently preferred, it should be understood that these embodiments are offered by way of example only. Accordingly, the present invention is not limited to a particular embodiment, but extends to various modifications that nevertheless fall within the scope of the appended claims. The order or sequence of any process or method steps may be varied or re-sequenced according to alternative embodiments.

What is claimed is:

1. A wireless control system for wireless control of a remote electronic system configured to provide information to a user, comprising:
   a trainable transmitter circuit configured to transmit a wireless control signal having control data which will control the remote electronic system;
   a control circuit coupled to the trainable transmitter circuit configured to transmit the wireless control signal using the trainable transmitter circuit based on a state of the wireless control system; and
   a multi-colored light emitting diode display configured to provide an indication of the state of the wireless control system;
   wherein the control circuit is configured to cause the multi-colored light emitting diode display to emit a first color when the wireless control system is in a training state and is configured to cause the multi-colored light emitting diode display to emit a second color when the wireless control system is in a transmitting state;

wherein the control circuit is configured to use the multi-colored light emitting diode display to provide feedback indicative of received signal strength during the training state.

2. The wireless control system of claim 1, further comprising a vehicle interior element coupled to the trainable transmitter circuit and the control circuit, wherein the wireless control system is configured for mounting in a vehicle interior.

3. The wireless control system of claim 2, wherein the vehicle interior element is an overhead console, a visor, or an instrument panel.

4. The wireless control system of claim 1, further including a receiver circuit configured to receive a wireless signal, wherein the control circuit is configured to identify and store a data code on the wireless signal, and wherein the wireless control signal transmitted by the trainable transmitter circuit includes the stored data code.

5. The wireless control system of claim 4, wherein the trainable transmitter circuit is configured to receive the wireless control signal from an original transmitter for the remote electronic system; and wherein the control circuit causes the multi-colored light emitting diode display to indicate when the strength of the wireless control signal received from the original transmitter is sufficient for the control circuit to record a frequency and control data associated with the wireless control signal to memory.

6. The wireless control system of claim 1, wherein the control circuit is configured to change the state of the wireless control system and the color of the light emitting diode display based upon receipt of a change of state instruction.

7. The wireless control system of claim 1, wherein the control circuit is coupled to a GPS device and the control circuit changes from a first state to a second state based on a location determination, and wherein the control circuit causes the multi-colored light emitting diode display to change colors based on the change from the first state to the second state.

8. The wireless control system of claim 1, wherein the remote electronic system is a garage door opener.

9. The wireless control system of claim 1, wherein the control circuit is configured to use the multi-colored light emitting diode display to provide feedback indicative of the status of an remote electronic system.

10. The wireless control system of claim 9, wherein the control circuit is configured to use the multi-colored light emitting diode display to display a green color to indicate a successful operation by the remote electronic system.

11. The wireless control system of claim 1, wherein the multi-colored light emitting diode display only provides feedback indicative of received signal strength during the training state.

\* \* \* \* \*